United States Patent
Iwase

(10) Patent No.: US 11,646,475 B2
(45) Date of Patent: May 9, 2023

(54) NONAQUEOUS ELECTROLYTE SECONDARY BATTERY

(71) Applicant: TOYOTA JIDOSHA KABUSHIKI KAISHA, Toyota (JP)

(72) Inventor: Kosuke Iwase, Konan (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 237 days.

(21) Appl. No.: 17/009,828

(22) Filed: Sep. 2, 2020

(65) Prior Publication Data

US 2021/0098769 A1    Apr. 1, 2021

(30) Foreign Application Priority Data

Sep. 26, 2019   (JP) .............................. JP2019-175415

(51) Int. Cl.
*H01M 50/581*   (2021.01)
*H01M 10/0525*   (2010.01)
(Continued)

(52) U.S. Cl.
CPC ........... *H01M 50/581* (2021.01); *H01M 4/13* (2013.01); *H01M 10/0525* (2013.01);
(Continued)

(58) Field of Classification Search
CPC .... H01M 50/581; H01M 50/531; H01M 4/13; H01M 10/0525; H01M 10/0587; H01M 2200/10
(Continued)

(56) References Cited

U.S. PATENT DOCUMENTS

2010/0188048 A1    7/2010   Nishino et al.

FOREIGN PATENT DOCUMENTS

| CN | 101689677 A | 3/2010 |
| CN | 106605319 A | 4/2017 |

(Continued)

OTHER PUBLICATIONS

Yusuke (translation) (Year: 2016).*
Kenji (translation) (Year: 2017).*
Yatomni (Year: 2017).*

*Primary Examiner* — Matthew T Martin
*Assistant Examiner* — Paul Christian St Wyrough
(74) *Attorney, Agent, or Firm* — Dickinson Wright, PLLC

(57) ABSTRACT

An electrode body of a secondary battery described herein includes: a core portion where electrode mixture layers of a plurality of electrode sheets are laminated; terminal connecting portions where respective current collector foil exposed portions are laminated, and a mixture layer non-facing portion where the electrode mixture layer faces the current collector foil exposed portion, the mixture layer non-facing portion being formed in a boundary between the terminal connecting portion and the core portion. In the secondary battery described herein, a short-circuit promoting portion having a predetermined depth (d) is formed in a separator provided between the electrode sheets in the mixture layer non-facing portion. Hereby, before a battery temperature rapidly increases to a high-temperature range due to occurrence of internal short-circuit between the electrode mixture layers, internal short-circuit is caused between the electrode mixture layer and the current collector foil exposed portion, so that charging can be stopped.

5 Claims, 5 Drawing Sheets

(51) Int. Cl.
*H01M 10/0587* (2010.01)
*H01M 4/13* (2010.01)
*H01M 50/531* (2021.01)

(52) U.S. Cl.
CPC ..... *H01M 10/0587* (2013.01); *H01M 50/531* (2021.01); *H01M 2200/10* (2013.01)

(58) Field of Classification Search
USPC .......................................................... 429/61
See application file for complete search history.

(56) References Cited

FOREIGN PATENT DOCUMENTS

| | | | | |
|---|---|---|---|---|
| JP | 2006331922 A | 12/2006 | | |
| KR | 10-2010-0040298 A | 4/2010 | | |
| KR | 10-2017-0033441 A | 3/2017 | | |
| WO | 2016/034936 A1 | 3/2016 | | |
| WO | WO-2016034936 A1 * | 3/2016 | ........ | H01M 10/0431 |
| WO | WO-2017159742 A1 * | 9/2017 | ............ | H01G 11/06 |
| WO | WO-2017163932 A1 * | 9/2017 | .......... | H01M 10/052 |

\* cited by examiner

NONAQUEOUS ELECTROLYTE SECONDARY BATTERY

INCORPORATION BY REFERENCE

The disclosure of Japanese Patent Application No. 2019-175415 filed on Sep. 26, 2019 including the specification, drawings and abstract is incorporated herein by reference in its entirety.

BACKGROUND

1. Technical Field

The present disclosure relates to a nonaqueous electrolyte secondary battery.

2. Description of Related Art

In recent years, a nonaqueous electrolyte secondary battery such as a lithium-ion secondary battery has been used appropriately for a portable power supply for a personal computer, a portable terminal, and the like, and a vehicle drive power supply for an electric vehicle (EV), a hybrid vehicle (HV), a plug-in hybrid vehicle (PHV), and the like. In some cases, when a large current flows through the nonaqueous electrolyte secondary battery at the time of charging and an overcharge state is caused, a battery temperature might increase to a high-temperature range of 200° C. or more. As one technology to secure high safety by preventing such a temperature increase to the high-temperature range in the overcharge, there is a technology to provide a shutdown function to a separator provided between a positive electrode and a negative electrode. More specifically, micropores through which charge carriers (e.g., lithium ions) are passed are formed in the separator of the nonaqueous electrolyte secondary battery. The separator having the shutdown function is configured to close the micropores by melting due to a temperature increase at an early stage of overcharge, so that charging can be stopped before the temperature increase to the high-temperature range starts. One example of the separator having such a shutdown function is described in Japanese Unexamined Patent Application Publication No. 2006-331922 (JP 2006-331922 A).

SUMMARY

In the meantime, in the field of the nonaqueous electrolyte secondary battery in recent years, the development of a technology that can more surely prevent the temperature increase to the high-temperature range in case of overcharge has been demanded due to an increasing need for safety. For example, in a case where an excessive current is supplied at an early stage of overcharge and a temperature largely increases, melting of the separator might proceed rapidly. In this case, internal short-circuit might occur due to contact between the positive electrode and the negative electrode before charging is stopped (the shutdown function works) by blocking charge carriers, so that the battery temperature might rapidly increase to the high-temperature range.

The present disclosure provides a nonaqueous electrolyte secondary battery that can prevent a rapid increase in a battery temperature to a high-temperature range when an excessive current is supplied during charging.

In order to achieve the above object, the present disclosure provides a nonaqueous electrolyte secondary battery (hereinafter also just referred to as a "secondary battery") having the following configuration.

The secondary battery described herein includes: an electrode body in which a plurality of electrode sheets is laminated via a separator; and a pair of electrode terminals electrically connected to the electrode body. Each of the electrode sheets is a sheet-shaped electrode in which an electrode mixture layer is formed on a surface of a current collector foil, the each of the electrode sheets including a current collector foil exposed portion in which the current collector foil is exposed, the current collector foil exposed portion being formed in a corresponding one of side edge portions, in the width direction, of the each of the electrode sheets. The electrode body includes: a core portion where the electrode mixture layers of the electrode sheets are laminated in a central part of the electrode body in the width direction; terminal connecting portions to which the electrode terminals are connected, respectively, the terminal connecting portions being formed in both side edge portions of the electrode body in the width direction such that respective current collector foil exposed portions are laminated; and a mixture layer non-facing portion formed in at least one of boundaries of the core portion with the terminal connecting portions, the mixture layer non-facing portion being configured such that the electrode mixture layer faces the current collector foil exposed portion. A short-circuit promoting portion constituted by a recessed portion having a depth of 30% or more of a thickness of the separator is formed in the separator provided between the electrode sheets in the mixture layer non-facing portion.

In the secondary battery described herein, the recessed portion (the short-circuit promoting portion) having a predetermined depth is formed in the separator. When the separator having such a structure is heated, the separator starts to melt from a position where the short-circuit promoting portion is formed. On this account, by adjusting a formation position of the short-circuit promoting portion, a position where internal short-circuit is to occur when a temperature increases due to supply of an excessive current can be controlled. In the secondary battery described herein, the short-circuit promoting portion is formed in the mixture layer non-facing portion where the electrode mixture layer faces the current collector foil exposed portion. According to the examination of the inventors of the present disclosure, a sudden temperature increase to a high-temperature range occurs when internal short-circuit occurs between the electrode mixture layers in the core portion of the electrode body. Even when internal short-circuit occurs between the electrode mixture layer and the current collector foil exposed portion (the current collector foil) in the mixture layer non-facing portion, charging stops without a sudden temperature increase. That is, with the secondary battery described herein, the formation position of the short-circuit promoting portion in the separator is adjusted so that internal short-circuit is caused between the electrode mixture layer and the current collector foil when a temperature increases due to supply of an excessive current. This makes it possible to prevent a battery temperature from rapidly increasing to a high-temperature range.

The short-circuit promoting portion may be an elongated groove extending along a side edge of the core portion.

Hereby, heat generated in the core portion at the time when a large temperature increase occurs in the core portion of the electrode body is efficiently transmitted to the short-circuit promoting portion. This makes it possible to appropriately cause internal short-circuit in the mixture layer non-facing portion.

Joining portions where the terminal connecting portions are joined to the electrode terminals, respectively, may be formed in respective connection parts of the terminal connecting portions with the electrode terminals. A total area of the short-circuit promoting portion may be 25% or more of an area of a joining portion closer to the short-circuit promoting portion out of the joining portions.

In a general secondary battery, at the time when an excessive current is supplied, the joining portion between the terminal connecting portion and the electrode terminal may suddenly generate heat in some cases. In this aspect, the area of the short-circuit promoting portion is defined in consideration of heat generation in the joining portion. This accordingly makes it possible to more appropriately cause internal short-circuit in the mixture layer non-facing portion.

The short-circuit promoting portion may be formed in a separator placed on an outermost side in the thickness direction of the electrode body.

This makes it possible to easily form the short-circuit promoting portion, thereby making it possible to restrain a decrease in production efficiency to be cause by providing a step of forming the short-circuit promoting portion.

The short-circuit promoting portion may be formed in a separator placed on an inner side in the thickness direction of the electrode body.

Inside an electrode body in a general secondary battery, heat is easily generated, but the heat is hard to dissipate. Accordingly, the inside of the electrode body tends to easily increase in temperature. In consideration of this point, the short-circuit promoting portion is formed in the separator placed inside the electrode body. This makes it possible to appropriately cause internal short-circuit in the mixture layer non-facing portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes a lithium-ion secondary battery as an example of a nonaqueous electrolyte secondary battery according to one embodiment of the present disclosure with reference to the drawings. In the following drawings, the same reference sign is assigned to members or parts that yield the same effect. Note that a dimensional relationship (length, width, thickness, and the like) in each drawing does not show an actual dimensional relationship. Further, a matter that is not particularly mentioned in the present specification but is necessary for execution of the present disclosure (e.g., an electrolyte composition, a manufacturing method, and so on) can be understood as a design matter of a person skilled in the art based on conventional techniques in the art. Note that a structure of the nonaqueous electrolyte secondary battery described herein is not limited to a lithium-ion secondary battery and is applicable to various secondary batteries (e.g., a nickel-metal hydride battery).

1. First Embodiment

Figure 1:
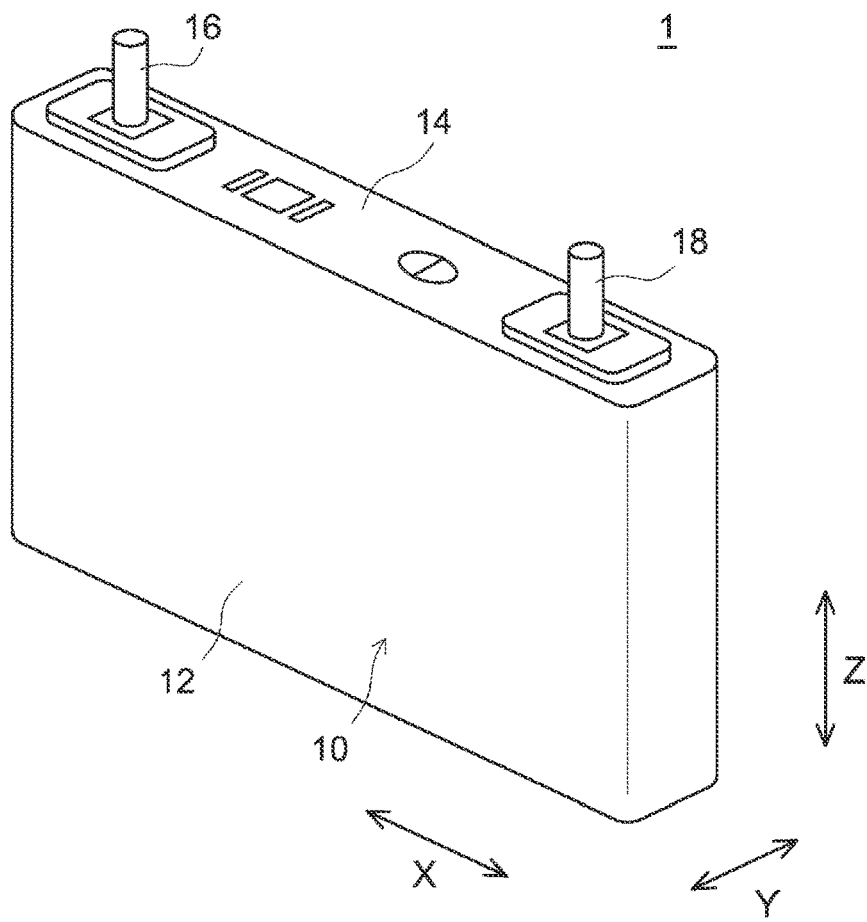
FIG. 1 is a perspective view schematically illustrating a nonaqueous electrolyte secondary battery according to one embodiment of the present disclosure.
Figure 2:
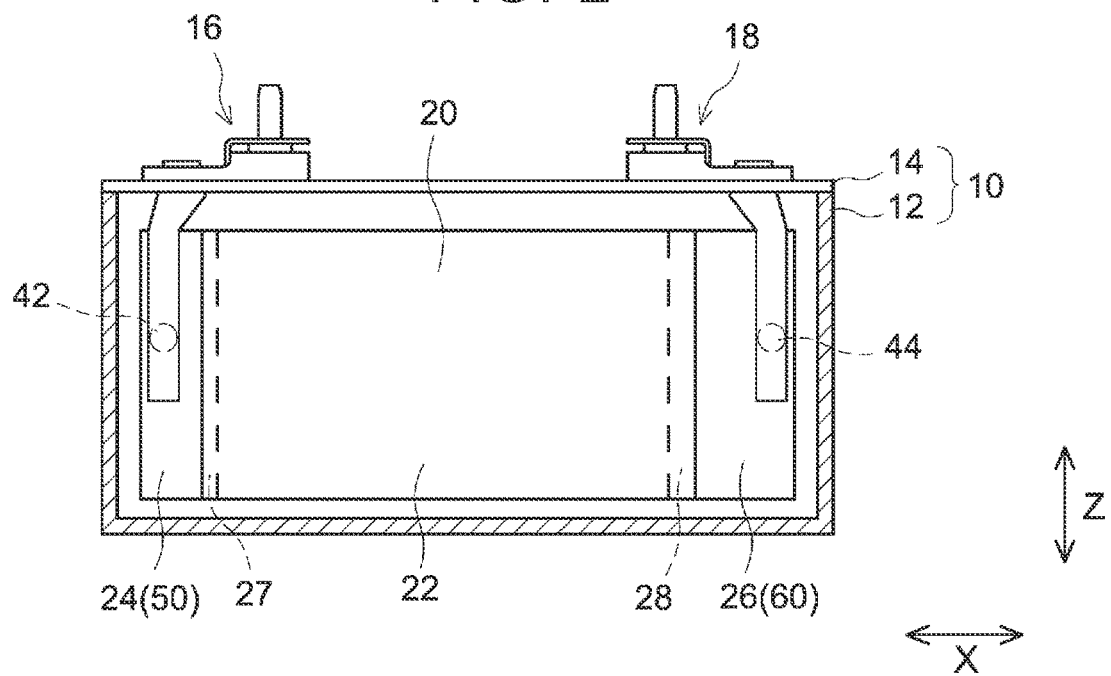
FIG. 2 is a front view schematically illustrating an internal structure of the nonaqueous electrolyte secondary battery according to one embodiment of the present disclosure.
Figure 3:
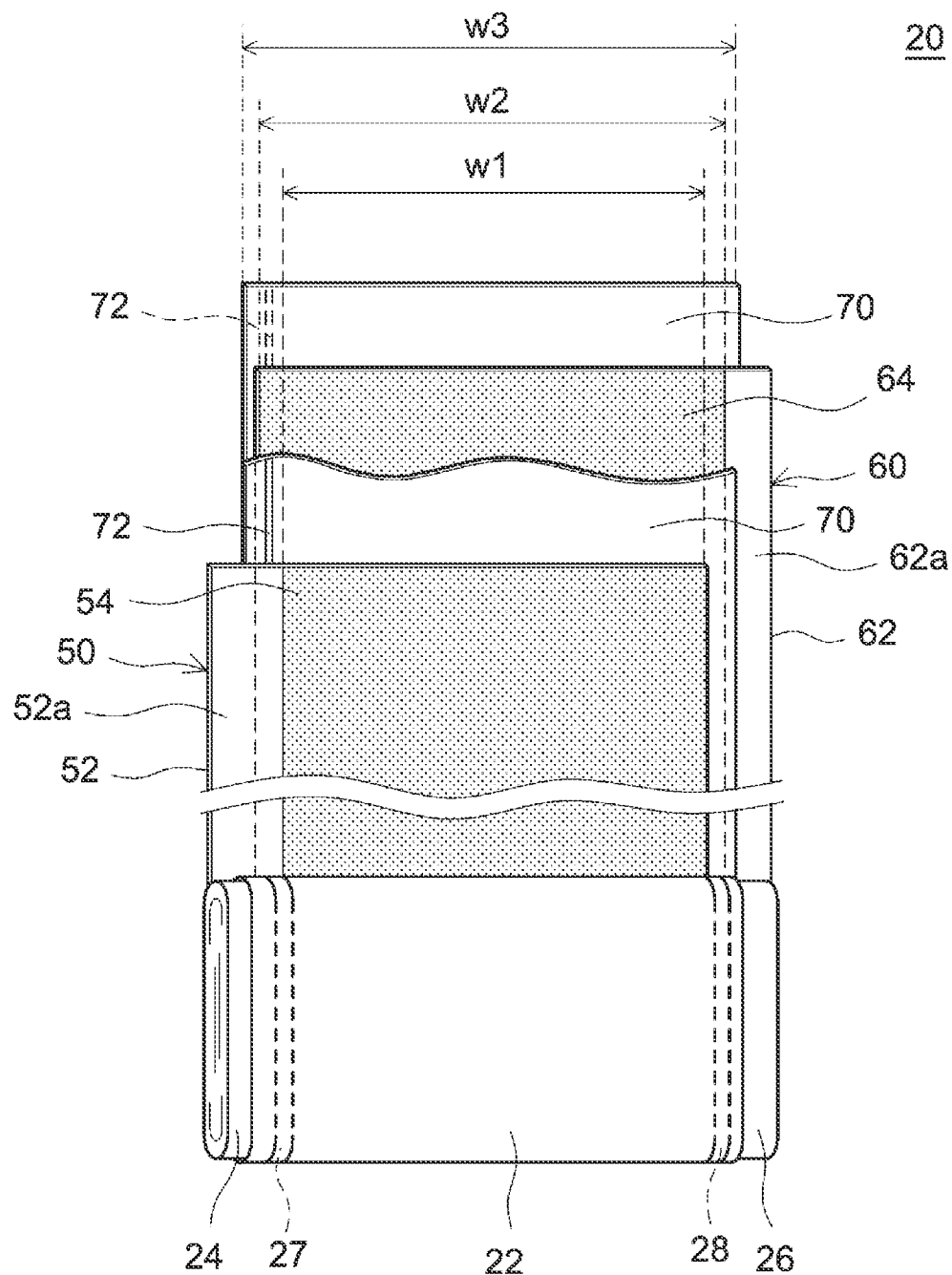
FIG. 3 is a perspective view schematically illustrating a wound electrode body in one embodiment of the present disclosure.
Figure 4:
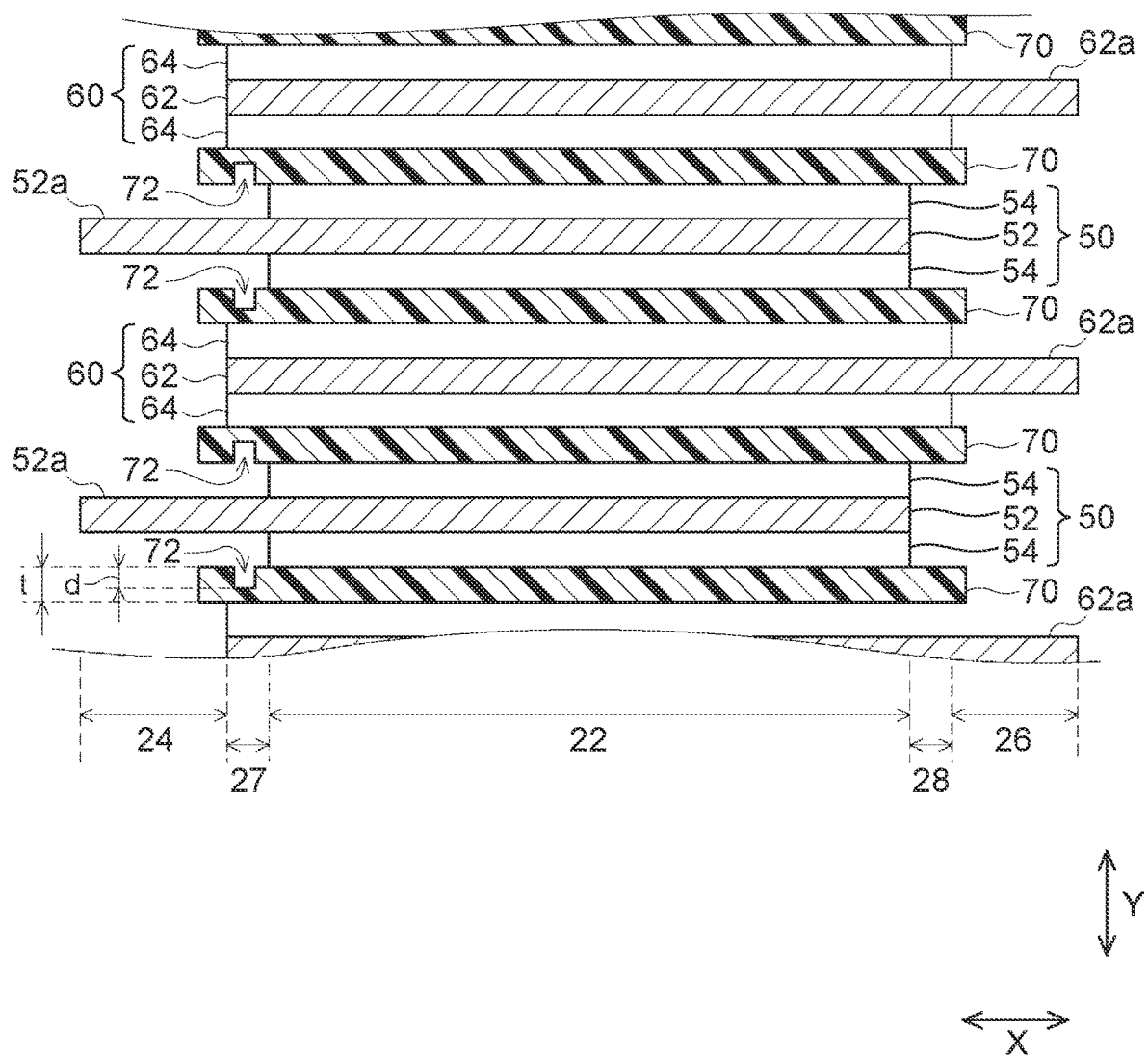
FIG. 4 is a view schematically illustrating a section of the wound electrode body along the width direction in one embodiment of the present disclosure.

FIG. 1 is a perspective view schematically illustrating a nonaqueous electrolyte secondary battery according to the present embodiment. FIG. 2 is a front view schematically illustrating an internal structure of the nonaqueous electrolyte secondary battery according to the present embodiment. FIG. 3 is a perspective view schematically illustrating a wound electrode body in the present embodiment. Further, FIG. 4 is a view schematically illustrating a section of the wound electrode body along the width direction in the present embodiment. Further, in each drawing, a reference sign X indicates "the width direction (of the nonaqueous electrolyte secondary battery)," a reference sign Y indicates "the thickness direction (of the nonaqueous electrolyte secondary battery)," and a reference sign Z indicates "the height direction (of the nonaqueous electrolyte secondary battery)." Note that these directions are defined for purpose of this description and do not intend to limit a direction to provide the nonaqueous electrolyte secondary battery described herein.

(1) Case

As illustrated in FIG. 1, a nonaqueous electrolyte secondary battery 1 according to the present embodiment includes a flat square case 10. The case 10 includes a square case main body 12 having an upside opening (not shown), and a cover 14 that closes the upside opening. It is preferable that the case 10 be mainly made of a metallic material having a light weight and a high strength, e.g., aluminum alloy and the like. As illustrated in FIG. 2, an electrode body 20 is accommodated inside the case 10. Further, although not illustrated herein, a nonaqueous electrolyte (typically, a nonaqueous electrolyte solution) is also accommodated inside the case 10 in addition to the electrode body 20. As the nonaqueous electrolyte, any nonaqueous electrolyte that is used in a general lithium-ion secondary battery can be used without any particular limit. The nonaqueous electrolyte does not characterize the present disclosure and therefore is not described herein.

Further, the secondary battery 1 according to the present embodiment includes a pair of electrode terminals electrically connected to the electrode body 20. The connection between the electrode body 20 and the electrode terminals will be described later more specifically. However, in the present specification, an electrode terminal connected to a positive side of the electrode body 20 is referred to as a "positive terminal 16," and an electrode terminal connected to a negative side is referred to as a "negative terminal 18." The positive terminal 16 and the negative terminal 18 are attached to the cover 14 of the case 10.

(2) Electrode Body

As illustrated in FIG. 3, the electrode body 20 is formed by laminating a plurality of electrode sheets 50, 60 via separators 70. The electrode body 20 used in the present embodiment is a flat-shaped wound electrode body. The flat-shaped wound electrode body 20 is formed such that a laminated body in which a pair of positive and negative electrode sheets 50, 60 is laminated via two separators 70 is formed, and a wound body obtained by winding the laminated body in a laminated manner is flattened by pressing. Note that means for forming the flat-shaped wound electrode body is not limited to this, and means for winding the separators and the electrode sheets around a rectangular plate-shaped core in a laminated manner can be employed, for example.

(3) Electrode

The electrode sheets 50, 60 are sheet-shaped electrodes in which electrode mixture layers 54, 64 are formed on respective surfaces of current collector foils 52, 62. Further, current collector foil exposed portions 52a, 62a are formed in their corresponding side edge portions, in the width direction X, of the electrode sheets 50, 60. In the current collector foil exposed portions 52a, 62a, the electrode mixture layers 54, 64 are not formed and the current collector foils 52, 62 are exposed. Note that, in the present specification, the electrode sheet 50 on the positive side is referred to as the "positive electrode sheet 50," and the electrode sheet 60 on the negative side is referred to as the "negative electrode sheet 60." The following describes the positive electrode sheet 50 and the negative electrode sheet 60 more specifically.

(a) Positive Electrode Sheet

The positive electrode sheet 50 includes a positive-electrode current collector foil 52, and positive-electrode mixture layers 54 formed on both surfaces of the positive-electrode current collector foil 52. In a first side edge portion, in the width direction X, of the positive electrode sheet 50, a positive-electrode exposed portion 52a in which the positive-electrode mixture layer 54 is not formed and the positive-electrode current collector foil 52 is exposed is formed. Any material used for a positive-electrode current collector foil in this type of secondary battery can be used for the positive-electrode current collector foil 52 without any particular limit. Typically, it is preferable that the positive-electrode current collector foil 52 be made of metal that is cheap and has good conductivity, e.g., metals such as aluminum, nickel, titanium, and stainless steel, alloys including those metals, and so on.

The positive-electrode mixture layer 54 includes a positive-electrode active material. Examples of such a positive-electrode active material include a composite oxide having a layer structure, represented by $LiCoO_2$, $LiNiO_2$, $LiNi_xCo_yMn_{(1-x-y)}O_2$ (here, $0<x<1$, $0<y<1$, $0<x+y<1$), and so on. Further, examples of the positive-electrode active material include a composite oxide having a spinel structure, represented by $Li_2NiMn_3O_8$, $LiMn_2O_4$, $Li_{1+x}Mn_{2-y}M_yO_4$ (here, M is not present or one or more metal elements selected from Al, Mg, Co, Fe, Ni, and Zn, $0 \leq x<1$, $0 \leq y<2$), a composite compound having an olivine structure such as $LiFePO_4$, and so on. Note that the positive-electrode active material does not limit the technology described herein, and various compounds conventionally used in this type of secondary battery can be used. The positive-electrode active material will be omitted more specifically.

Note that a given component other than the positive-electrode active material may be added to the positive-electrode mixture layer 54. Examples of the given component include a conductive material, a binder, and the like, for example. As the conductive material, a carbon material such as acetylene black (AB), graphite, or carbon nanotube can be used appropriately. Further, as the binder, a fluorine-based binder such as polyvinylidene fluoride (PVDF) or polytetrafluoroethylene (PTFE), a rubber-based binder such as styrene butadiene rubber (SBR), or the like can be used.

(b) Negative Electrode Sheet

The negative electrode sheet 60 includes a negative-electrode current collector foil 62, and negative-electrode mixture layers 64 formed on both surfaces of the negative-electrode current collector foil 62. Similarly to the positive electrode sheet 50, the negative electrode sheet 60 is also provided with a current collector foil exposed portion. More specifically, in a second side edge portion, in the width direction X, of the negative electrode sheet 60, a negative-electrode exposed portion 62a in which the negative-electrode mixture layer 64 is not formed and the negative-electrode current collector foil 62 is exposed is formed. Any material used for a negative-electrode current collector foil in this type of secondary battery can be used for the negative-electrode current collector foil 62 without any particular limit. Typically, the negative-electrode current collector foil 62 can be made of metal that is cheap and has good conductivity, e.g., copper or alloy mainly made of copper.

Further, as illustrated in FIG. 3, in the secondary battery according to the present embodiment, in order to restrain precipitation of metal Li on the negative side by increasing the capacity of the negative-electrode mixture layer 64, the negative-electrode mixture layer 64 having a width w2 longer than a width w1 of the positive-electrode mixture layer 54 is formed. The negative-electrode mixture layer 64 includes a negative-electrode active material. Examples of such a negative-electrode active material include carbon materials such as graphite, meso-carbon microbeads, and carbon black (acetylene black, ketjen black, and the like). Note that the negative-electrode active material does not limit the technology described herein, and various compounds conventionally used in this type of secondary battery can be used. The negative-electrode active material will be omitted more specifically.

Further, a given component other than the negative-electrode active material may be added to the negative-electrode mixture layer 64. For example, a thickener, a binder, or the like can be added to the negative-electrode mixture layer 64. As the thickener, carboxymethyl cellulose (CMC) or the like can be used. Further, as the binder, a fluorine-based binder such as PVDF or PTFE, a rubber-based binder such as SBR, or the like can be used appropriately, similarly to the positive-electrode mixture layer 54.

(4) Separator

The separator 70 is an insulating sheet-shaped member provided between the electrode sheets 50, 60. In the electrode body 20 in the present embodiment, two separators 70 having a width w3 longer than the width w2 of the negative-electrode mixture layer 64 are used. One of the separators 70 is placed on a back face of the positive electrode sheet 50, and the other one of the separators 70 is placed on a back face of the negative electrode sheet 60. As such, when a laminated body in which sheet-shaped members are laminated in order of the separator 70, the negative electrode sheet 60, the separator 70, and the positive electrode sheet 50 is wound, the wound electrode body 20 in which the positive electrode sheet 50 and the negative electrode sheet 60 are wound via the two separators 70 in a laminated manner is formed.

Further, a plurality of micropores through which charge carriers (e.g., lithium ions) are passed is formed in the separator 70. This makes it possible to move the charge carriers between the positive electrode sheet 50 and the negative electrode sheet 60 while short-circuit between the positive electrode sheet 50 and the negative electrode sheet 60 is prevented. As a material for the separator 70, any material used for a general secondary battery can be used without any particular limit. Examples of the material for the separator 70 include resin materials such as polyethylene (PE), polypropylene (PP), polyester, cellulose, and polyamide. Among them, a resin sheet made of polyolefin resin such as PE or PP melts at a temperature from about 80° C. to 140° C. (typically, 90° C. to 120° C., preferably 100° C. to 110° C., and, for example, 105° C.), so that a shutdown function to close the micropores can be achieved. Further, the polyolefin resin described above is also preferable from the viewpoint of causing melting of the separator 70 from a short-circuit promoting portion 72 (described later) appropriately. Note that the separator 70 may be a single-layered structure constituted by a single material or may be a structure in which two or more types of resin sheets made of different materials or having different properties (e.g., an average thickness, a porosity, or the like) are laminated (e.g., a three-layer structure in which a PP layer is laminated on each surface of a PE layer).

The short-circuit promoting portion 72 is formed in the separator 70 used in the present embodiment. As illustrated in FIG. 4, the short-circuit promoting portion 72 is a recessed portion having a depth d that is 30% or more of a thickness t of the separator 70. When the separator 70 having such a short-circuit promoting portion 72 is heated, the separator 70 starts to melt from a thin position where the short-circuit promoting portion 72 is formed. On this account, by adjusting a formation position of the short-circuit promoting portion 72 in the separator 70, a position where internal short-circuit occurs between the positive electrode sheet 50 and the negative electrode sheet 60 when a temperature increases due to an excessive charge current can be controlled. Note that, from the viewpoint of more surely causing internal short-circuit at an intended position, the depth d of the short-circuit promoting portion 72 is preferably 35% or more of the thickness t of the separator 70, more preferably 40% or more, further preferably 45% or more, and particularly preferably 50% or more. In the meantime, from the viewpoint of causing intended internal short-circuit, the upper limit of the depth d of the short-circuit promoting portion 72 is not limited particularly and may be 90% or less of the thickness t of the separator 70. Note that, in consideration of the strength of the separator 70, the upper limit of the depth d of the short-circuit promoting portion 72 is preferably 80% or less of the thickness t of the separator 70, more preferably 75% or less, further preferably 70% or less, and particularly preferably 65% or less.

In the secondary battery according to the present embodiment, the short-circuit promoting portion 72 is formed in the separator provided between the electrode sheets, in a region called a mixture layer non-facing portion where an electrode mixture layer faces a current collector foil exposed portion. Accordingly, at the time when an excessive current is supplied during charging and a temperature largely increases, internal short-circuit is intentionally caused between the electrode mixture layer and the current collector foil exposed portion (the current collector foil), so that charging can be stopped before a rapid temperature increase to a high-temperature range occurs. The following describes details of the formation position of the short-circuit promoting portion 72 in the secondary battery 1 according to the present embodiment, together with a detailed structure of the wound electrode body 20.

First, as illustrated in FIG. 3, in the present embodiment, at the time when the wound electrode body 20 is manufactured, the positive electrode sheet 50 and the negative electrode sheet 60 are laminated such that the positive-electrode exposed portion 52a protrudes from a first side in the width direction X and the negative-electrode exposed portion 62a protrudes from a second side in the width direction X. In the wound electrode body 20 obtained by winding the laminated body, three types of regions, i.e., a core portion 22, terminal connecting portions 24, 26, and mixture layer non-facing portions 27, 28, are formed.

The core portion 22 is a region formed in a central part, in the width direction X, of the wound electrode body 20. In the core portion 22, the electrode mixture layers 54, 64 of the electrode sheets 50, 60 are laminated. In the core portion 22 in the present embodiment, the positive-electrode mixture layer 54 and the negative-electrode mixture layer 64 are wound in a laminated manner so as to face each other via the separator 70. In the secondary battery 1 according to the present embodiment, charge and discharge reactions by the movement of the charge carriers mainly occur in the core portion 22.

Further, the terminal connecting portions 24, 26 are respective regions formed in both side edge portions, in the width direction X, of the wound electrode body 20. The current collector foil exposed portions 52a, 62a are laminated in the terminal connecting portions 24, 26, respectively, and the electrode terminals 16, 18 (see FIG. 2) are connected to the terminal connecting portions 24, 26, respectively. In the present embodiment, the terminal connecting portion (a positive-electrode connecting portion) 24 on the positive side where the positive-electrode exposed portion 52a is wound in a laminated manner is formed in the first side edge portion in the width direction X, and the terminal connecting portion (a negative-electrode connecting portion) 26 on the negative side where the negative-electrode exposed portion 62a is wound in a laminated manner is formed in the second side edge portion in the width direction X. The positive terminal 16 is connected to the positive-electrode connecting portion 24, and the negative terminal 18 is connected to the negative-electrode connecting portion 26 (see FIG. 2). The terminal connecting portions 24, 26 are connected to the electrode terminals 16, 18, respectively, by use of ultrasonic welding, laser beam welding, resistance welding, or the like, so that joining portions 42, 44 are formed in respective connection portions.

The mixture layer non-facing portions 27, 28 are regions each formed in a boundary between the core portion 22 and a corresponding one of the terminal connecting portions 24, 26 such that the electrode mixture layers 54, 64 do not face each other. More specifically, as illustrated in FIG. 3, in the present embodiment, the width w2 of the negative-electrode mixture layer 64 is set to be longer than the width w1 of the positive-electrode mixture layer 54. Accordingly, in the boundary between the core portion 22 in the central part of the wound electrode body 20 and each of the terminal connecting portions 24, 26 provided in both side edge portions of the wound electrode body 20, a corresponding one of the mixture layer non-facing portions 27, 28 where the positive-electrode mixture layer 54 is not provided and the negative-electrode mixture layer 64 is provided is formed. More specifically, in the boundary between the positive-electrode connecting portion 24 and the core portion 22, the mixture layer non-facing portion 27 where the negative-electrode mixture layer 64 and the positive-electrode exposed portion 52a (the positive-electrode current collector foil 52) are wound in a laminated manner via the separators 70 is formed. In the meantime, in the boundary between the negative-electrode connecting portion 26 and the core portion 22, the mixture layer non-facing portion 28 where the separators 70 and the negative-electrode mixture layer 64 are wound in a laminated manner is formed.

As illustrated in FIGS. 3 and 4, in the secondary battery 1 of the present embodiment, the short-circuit promoting portion 72 is formed in the separator 70 in the mixture layer non-facing portion 27 where the electrode mixture layer (the negative-electrode mixture layer 64) faces the current collector foil exposed portion (the positive-electrode exposed portion 52a). Hereby, at the time when the temperature increases due to an excessive charge current, the separator 70 placed in the mixture layer non-facing portion 27 melts earlier than other regions, so that internal short-circuit occurs between the negative-electrode mixture layer 64 and the positive-electrode exposed portion 52a. When internal short-circuit occurs between the electrode mixture layer and the current collector foil as such, charging is stopped. However, it is found by the inventors that the degree of temperature increase at this time is lower than the degree of a temperature increase in internal short-circuit between the electrode mixture layers to be caused in the core portion. Accordingly, in the present embodiment, the formation position of the short-circuit promoting portion 72 is adjusted such that, at the time when an excessive charge current is supplied and the temperature increases, charging is stopped by causing internal short-circuit between the electrode mixture layer 64 and the current collector foil 52 before occurrence of internal short-circuit in the core portion 22 that causes a sudden temperature increase to a high-temperature range. Accordingly, with the secondary battery 1 of the present embodiment, it is possible to prevent a rapid increase in a battery temperature to the high-temperature range when an excessive current is supplied during charging, thereby making it possible to secure safety higher than before.

Note that the short-circuit promoting portion 72 in the present embodiment is an elongated groove extending along a side edge of the core portion 22 (see FIG. 3). The short-circuit promoting portion 72 having such an elongated groove shape is formed in the separator 70 over the whole circumference of the wound electrode body 20. The short-circuit promoting portion 72 having such an elongated groove shape can be formed by placing a scriber on a transfer line of the separator 70 at the time when the wound electrode body 20 is formed. By forming the short-circuit promoting portion 72 along the core portion 22, large heat generated in the core portion 22 can be efficiently transmitted to the short-circuit promoting portion 72. This makes it possible to appropriately melt the separator 70 in the mixture layer non-facing portion 27, thereby making it possible to prevent the occurrence of internal short-circuit in the core portion 22.

Further, another example of a heat generation part at the time when an excessive charge current is supplied is the joining portions 42, 44 (see FIG. 2) between the terminal connecting portions 24, 26 and the electrode terminals 16, 18. In consideration of heat generation in the joining portions 42, 44, it is preferable that a total area of the short-circuit promoting portion 72 in a front view be 25% or more of an area of a joining portion closer to the short-circuit promoting portion 72 (herein, the joining portion 42 between the positive-electrode connecting portion 24 and the positive terminal 16). Further, from the viewpoint of more appropriately causing internal short-circuit in the mixture layer non-facing portion 27, the total area of the short-circuit promoting portion 72 is more preferably 30% or more of the area of the joining portion 42, further preferably 35% or more, and particularly preferably 40% or more. Further, the upper limit of the total area of the short-circuit promoting portion 72 is not limited particularly and may be 90% or less of the area of the joining portion 42. Note that, in consideration of the strength of the separator 70, the upper limit of the total area of the short-circuit promoting portion 72 is preferably 80% or less of the area of the joining portion 42, more preferably 70% or less, further preferably 60% or less, and particularly preferably 50% or less. Note that the "total area of the short-circuit promoting portion" in the present specification indicates a sum of the area of all short-circuit promoting portions formed on a separator surface in a front view and can be measured by examining respective surfaces of the separators used herein by disassembling the electrode body.

2. Other Embodiments

The above description deals with the nonaqueous electrolyte secondary battery according to one embodiment of the present disclosure. Note that the above embodiment is not intended to limit the present disclosure and can be modified variously. The following describes nonaqueous electrolyte secondary batteries according to other embodiments of the present disclosure.

(1) Shape of Short-circuit Promoting Portion

In the above embodiment, the short-circuit promoting portion 72 having an elongated groove shape along the side edge of the core portion 22 is formed in the separator 70. However, the shape of the short-circuit promoting portion in a front view is not limited particularly, provided that the short-circuit promoting portion is a recessed portion having a depth that is 30% or more of the thickness of the separator. For example, a plurality of dot-shaped recessed portions (short-circuit promoting portions) may be formed in the separator in the mixture layer non-facing portion. Further, a plurality of groove-shaped short-circuit promoting portions along the width direction of the electrode body may be formed in the separator in the mixture layer non-facing portion. Even in these cases, at the time when the temperature largely increases, melting of the separator can be started from the mixture layer non-facing portion, and internal short-circuit can be caused between the electrode mixture layer and the current collector foil.

Further, as illustrated in FIG. 4, in the above embodiment, the short-circuit promoting portion 72 is formed on one surface of the separator 70. However, the short-circuit promoting portions may be formed on both surfaces of the separator. Note that, in a case where the short-circuit promoting portions are formed on both surfaces of the separator, when the sum of depths of two short-circuit promoting portions is 30% or more of the thickness of the separator 70, the separator can be melted from the position where the short-circuit promoting portions are formed.

Figure 5:
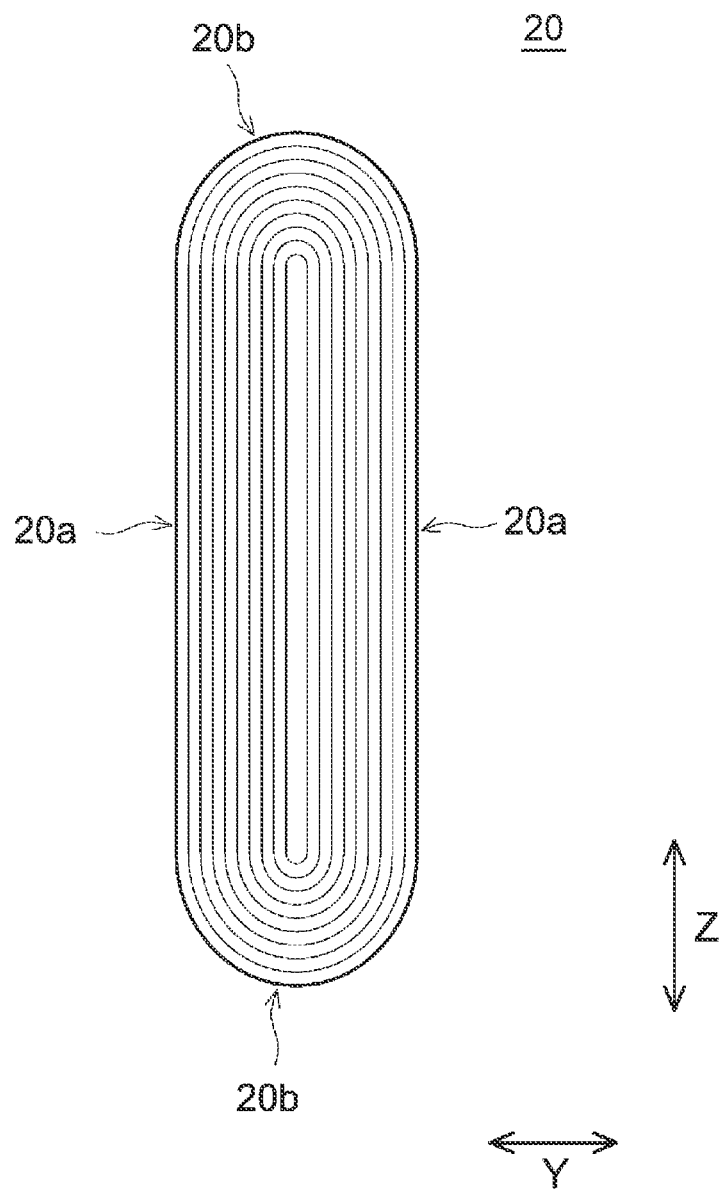
FIG. 5 is a side view schematically illustrating a wound electrode body in another embodiment of the present disclosure.

(2) Formation Position of Short-circuit Promoting Portion in Circumferential Direction In the above embodiment, the short-circuit promoting portion 72 having a groove shape along the side edge of the core portion 22 is formed over the whole circumference of the wound electrode body 20. However, it is not necessary for the short-circuit promoting portion to be formed over the whole circumference of the wound electrode body, and the short-circuit promoting portion may be formed only at a specific position in the circumferential direction. In this case, the strength of the separator can be secured sufficiently. For example, as illustrated in FIG. 5, the flat-shaped wound electrode body 20 includes a pair of flat portions 20a facing each other in a side view, and a pair of R portions 20b formed in both ends of the wound electrode body 20 in the height direction Z such that the electrode sheet curves. In the flat-shaped wound electrode body 20, the short-circuit promoting portion may be formed only in the separators placed in the flat portions 20a or may be formed only in the separators placed in the R portions 20b. Note that the general flat-shaped wound electrode body 20 has such a tendency that heat generated in the R portions 20b is hard to dissipate. In consideration of this point, it is preferable that the short-circuit promoting portion be formed in the separators placed in the R portions 20b.

Further, the short-circuit promoting portion may be formed only at a specific position in the electrode body 20 in the thickness direction Y. For example, the short-circuit promoting portion can be easily formed in the separator placed on the outermost side in the thickness direction Y. Accordingly, a decrease in production efficiency to be caused by providing a step of forming the short-circuit promoting portion can be restrained. In the meantime, in a general secondary battery, the inside of the electrode body easily generates heat, but the heat is hard to dissipate. Accordingly, the inside of the electrode body tends to easily increase in temperature. In consideration of this point, it is preferable that the short-circuit promoting portion be formed in the separator placed inside the electrode body 20 in the thickness direction Y.

(3) Formation Position of Short-circuit Promoting Portion in Front View

As illustrated in FIG. 3, in the above embodiment, the width w2 of the negative-electrode mixture layer 64 is longer than the width w1 of the positive-electrode mixture layer 54. Accordingly, the mixture layer non-facing portion 27 where the negative-electrode mixture layer 64 faces the positive-electrode exposed portion 52a is formed between the positive-electrode connecting portion 24 and the core portion 22. The short-circuit promoting portion 72 is formed in the separator 70 in the mixture layer non-facing portion 27 between the positive-electrode connecting portion 24 and the core portion 22.

However, the mixture layer non-facing portion where the short-circuit promoting portion is formed is not limited to the mixture layer non-facing portion where the negative-electrode mixture layer faces the positive-electrode exposed portion. For example, by adjusting an application width of each of the positive-electrode and negative-electrode mixture layers, respective laminated positions of the positive electrode sheet and the negative electrode sheet, and the like, a mixture layer non-facing portion where the positive-electrode mixture layer faces the negative-electrode exposed portion can be formed. In this case, the short-circuit promoting portion may be formed in the separator in the mixture layer non-facing portion where the positive-electrode mixture layer faces the negative-electrode exposed portion. Even in this case, at the time when the temperature largely increases, internal short-circuit is intentionally caused between the electrode mixture layer and the current collector foil, so that a sudden temperature increase to the high-temperature range due to internal short-circuit between the electrode mixture layers can be prevented. Further, the mixture layer non-facing portion does not need to be formed in the boundary between each of the terminal connecting portions and the core portion. For example, in a case where the mixture layer non-facing portion where the electrode mixture layer faces the current collector foil exposed portion is formed in the boundary between one of the terminal connecting portions and the core portion, when the short-circuit promoting portion is formed in the separator in this mixture layer non-facing portion, it is possible to prevent a sudden temperature increase to a high-temperature range due to internal short-circuit between the electrode mixture layers. In addition, in a case where the electrode mixture layer faces the current collector foil exposed portion in both mixture layer non-facing portions, the short-circuit promoting portions may be formed in the separators in those mixture layer non-facing portions.

Note that the width of the positive-electrode mixture layer may be the same as the width of the negative-electrode mixture layer. Even in this case, by adjusting respective laminated positions of the positive electrode sheet and the negative electrode sheet, it is possible to form the mixture layer non-facing portions.

(4) Formation of HRL Layer

Further, an HRL layer (Heat Resistant Layer) may be formed on the surface of the separator. The HRL layer is a layer including inorganic particles (e.g., alumina particles or the like) having high heat resistance. When such an HRL layer is formed, it is possible to restrain melting and contraction of the separator due to a temperature increase, thereby making it possible to more appropriately prevent internal short-circuit between the electrode mixture layers in the core portion. Note that, in a case where the HRL-layer applied separator is used, the short-circuit promoting portion may be formed in either of a surface of the separator on a side where the HRL layer is not formed and a surface of the separator on a side where the HRL layer is formed. In either case, it is possible to appropriately start melting of the separator from a position where the short-circuit promoting portion is formed. Note that, from the viewpoint of facilitating formation of the short-circuit promoting portion, it is preferable that the short-circuit promoting portion be formed on the surface of the separator on the side where the HRL layer is not formed. In the meantime, from the viewpoint of facilitating melting from the short-circuit promoting portion, it is preferable that the short-circuit promoting portion be formed on the surface of the separator on the side where the HRL layer is formed.

(5) Structure of Electrode Body

Figure 6:
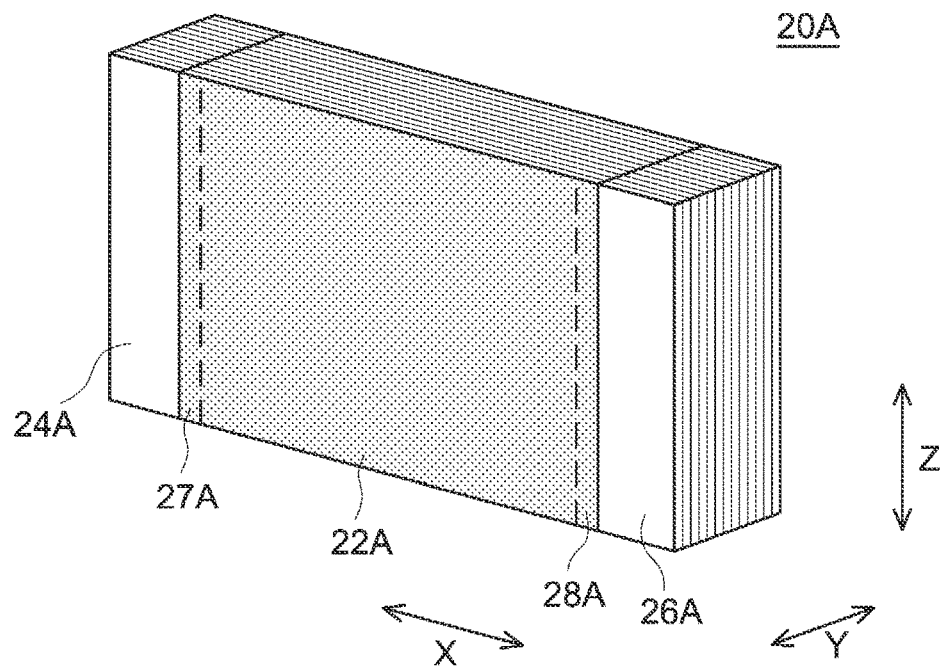
FIG. 6 is a perspective view schematically illustrating a configuration of a stacked electrode body in another embodiment of the present disclosure.

The above embodiment is targeted for the secondary battery including the wound electrode body 20 as illustrated in FIG. 3. However, the electrode body can employ various structures well known in the art as long as the effect of the technology described herein is not obstructed. In other words, the electrode body in the technology described herein is not limited to the wound electrode body in which the electrode sheets and the separators are wound in a laminated manner, provided that the electrode body is formed by laminating a plurality of electrode sheets via separators and includes a mixture layer non-facing portion where an electrode mixture layer faces a current collector foil exposed portion. Another example of such an electrode body includes a stacked electrode body in which a plurality of electrode sheets is stacked via separators. FIG. 6 is a perspective view schematically illustrating a configuration of the stacked electrode body in another embodiment, and FIG. 7 is an explanatory view schematically illustrating each member constituting the stacked electrode body.

Figure 7:
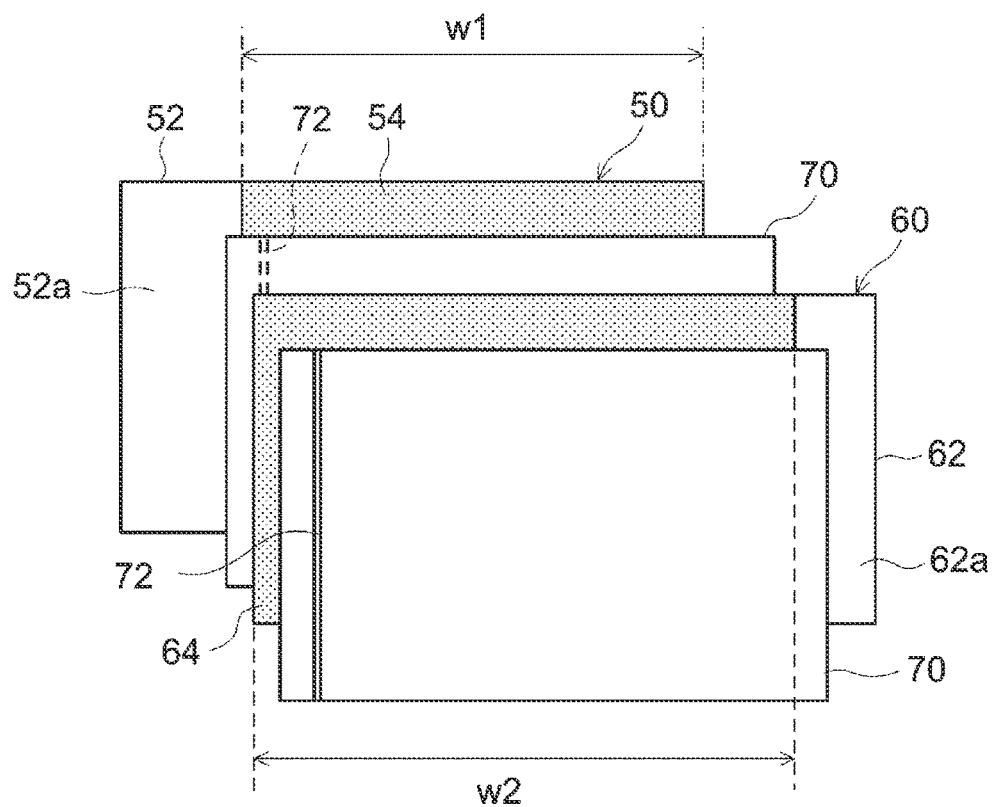
FIG. 7 is an explanatory view schematically illustrating each member constituting the stacked electrode body in another embodiment of the present disclosure.

As illustrated in FIGS. 6 and 7, a stacked electrode body 20A is configured such that a plurality of rectangular positive electrode sheets 50 and a plurality of rectangular negative electrode sheets 60 are stacked alternately with rectangular sheet-shaped separators 70 being provided therebetween. In the stacked electrode body 20A, a core portion 22A in which the positive-electrode mixture layers 54 and the negative-electrode mixture layers 64 are stacked, a positive-electrode connecting portion 24A in which the positive-electrode exposed portions 52a are stacked, and a negative-electrode connecting portion 26A in which the negative-electrode exposed portions 62a are stacked are formed. Also in the stacked electrode body 20A, the width w2 of the negative-electrode mixture layer 64 is set to be longer than the width w1 of the positive-electrode mixture layer 54, for example. Hereby, mixture layer non-facing portions 27A, 28A can be formed each in a boundary between the core portion 22A and a corresponding terminal connecting portion (the positive-electrode connecting portion 24A, the negative-electrode connecting portion 26A). Then, the short-circuit promoting portion 72 is formed in the separator 70 in the mixture layer non-facing portion 27A where the negative-electrode mixture layer 64 faces the positive-electrode exposed portion 52a. Hereby, at the time when a temperature largely increases due to an excessive charge current, internal short-circuit is caused between the negative-electrode mixture layer 64 and the positive-electrode exposed portion 52a, so that charging can be stopped. On this account, with the technology described herein, even in a case of the secondary battery including the stacked electrode body 20A, it is possible to appropriately prevent a sudden temperature increase to a high-temperature range to be caused due to internal short-circuit in the core portion 22.

Further, another example of the structure of the electrode body includes a cylindrical wound electrode body or the like. Even in a case where such a cylindrical wound electrode body is used, when the mixture layer non-facing portion where the electrode mixture layer faces the current collector foil exposed portion is formed, it is possible to appropriately restrain a sudden temperature increase to a high-temperature range to be caused due to internal short-circuit in the core portion 22, by forming the short-circuit promoting portion in the separator in the mixture layer non-facing portion.

Test Examples

The following describes tests related to the present disclosure. However, the following description is not intended to limit the present disclosure.

A. First Test

1. Manufacture of Sample (1) Sample 1

In Sample 1, positive slurry in which a positive-electrode active material ($LiNi_{1/3}Co_{1/3}Mn_{1/3}O_2$), a conductive material (AB), and a binder (PVdF) were dispersed in a solvent (NMP) at a mass ratio of 94:3:3 was first prepared. The positive slurry was then applied to both surfaces of a positive-electrode current collector foil (made of aluminum) and dried, and thus, a positive electrode sheet was manufactured. Subsequently, negative slurry in which a negative-electrode active material (graphite), a thickener (CMC), and a binder (SBR) were dispersed in a solvent (water) at a mass ratio of 98:1:1 was prepared. The negative slurry was then applied to both surfaces of a negative-electrode current collector foil (made of copper) and dried, and thus, a negative electrode sheet was manufactured. Then, HRL slurry in which inorganic particles (boehmite) and a binder (PVdF) were dispersed in a solvent (NMP) at a mass ratio of 98:2 was prepared. The HRL slurry was applied to one surface of a three-layer resin film (PP-PE-PP) having a thickness of 20 µm and then dried, so that an HRL-layer applied separator was manufactured.

Subsequently, a laminated body was manufactured by laminating sheet-shaped materials in order of the separator, the negative electrode, the separator, and the positive electrode such that the HRL layer of the separator faces the negative electrode sheet. At this time, the sheet-shaped materials were laminated such that a positive-electrode exposed portion protruded from a first side edge portion in the width direction, and a negative-electrode exposed portion protruded from a second side edge portion in the width direction. Further, in the present test, respective laminated positions of the sheets were adjusted such that a mixture layer non-facing portion where a negative-electrode mixture layer faced the positive-electrode exposed portion was formed between a positive-electrode connecting portion and a core portion. Then, a wound body obtained by winding the laminated body was flattened by pressing, so that a flat-shaped wound electrode body was manufactured.

Subsequently, a positive terminal (made of aluminum) was connected to the positive-electrode connecting portion of the wound electrode body by ultrasonic welding, and after that, a negative terminal (made of copper) was connected to a negative-electrode connecting portion by resistance welding. Then, the wound electrode body and a nonaqueous electrolyte were accommodated in a case (made of aluminum alloy), and the case was sealed. Thus, a lithium-ion secondary battery (Sample 1) for test was manufactured. Note that, in the present test, as the nonaqueous electrolyte, an electrolyte in which lithium salt ($LiPF_6$) was solved at a concentration of 1 mol/L in a solvent in which EC, EMC, and DMC were mixed at a volume ratio of 1:1:1 was used.

(2) Sample 2

In Sample 2, a test battery was manufactured under the same condition as Sample 1, except that a recessed portion (a short-circuit promoting portion) having a depth of 10% of the thickness of the separator (the thickness of the three-layer resin film) except the thickness of the HRL layer was formed on a surface of the separator on a side opposite to a side where the HRL layer was formed. Note that, in this sample, respective laminated positions of sheet-shaped members were adjusted such that the short-circuit promoting portion was placed in the mixture layer non-facing portion where the negative-electrode mixture layer faced the positive-electrode exposed portion. Further, in the present sample, the position of the short-circuit promoting portion was adjusted such that the short-circuit promoting portion was placed on the outermost side, in the thickness direction, of an R portion of the electrode body after winding.

(3) Samples 3 to 5

In Samples 3 to 5, test batteries were manufactured under the same condition as Sample 2 except that the depth of the short-circuit promoting portion was changed. Respective depths of the short-circuit promoting portions in Samples 3 to 5 are shown in Table 1 (described later).

2. Evaluation Test

In the present test, an overcharge test was performed such that a thermoelectric couple was inserted into the case of each sample. Note that the thermoelectric couple was placed in the vicinity of the core portion in the case. In the overcharge test, a test battery was set in an environment of −10° C., and an upper limit voltage was set to 25 V. Then, constant current charging (CC charging) was performed at a charging rate of 10 C from a state where a state of charge (SOC) was 10%. Then, a temperature inside the case during charging was measured to find a maximum temperature (°

C.) and find a timing when charging was stopped by internal short-circuit. The results are shown in Table 1.

TABLE 1

| | 1 | 2 | 3 | 4 | 5 |
|---|---|---|---|---|---|
| Depth of short-circuit promoting portion (vs separator thickness) | — | 10% | 20% | 25% | 30% |
| Charging stop timing | No stop | After six sec | After five sec | After four sec | After two sec |
| Maximum temperature (° C.) | 200° C. or more | 200° C. or more | 200° C. or more | 200° C. or more | 110° C. |

As illustrated in Table 1, in Sample 5, a sudden temperature increase to a high-temperature range was remarkedly restrained in comparison with other samples. Further, the timing when charging was stopped by internal short-circuit was also earlier than other samples. From this point, the following fact is found. That is, when the recessed portion (the short-circuit promoting portion) having a depth of 30% or more of the thickness of the separator is formed in the separator, melting of the separator can be promoted from a desired position. Accordingly, when the short-circuit promoting portion is placed in the mixture layer non-facing portion, it is possible to prevent short-circuit between the electrode mixture layers, thereby making it possible to restrain an excessive temperature increase.

B. Second Test

1. Manufacture of Sample

Five types of test batteries (Samples 6 to 10) were manufactured under the same condition as Sample 5 in the first test, except that the formation position of the short-circuit promoting portion in the separator was changed. Respective formation positions of the short-circuit promoting portions in the samples are shown in Table 2.

2. Evaluation Test

An overcharge test was performed under the same condition as the first test to find a maximum temperature (° C.) during charging and a charging stop timing. The results are shown in Table 2. Note that Table 2 also shows the results of Samples 1, 5 in the first test for comparison.

intermediate part, the outermost periphery, and the innermost periphery. Further, when Samples 5, 7, 9 in which the short-circuit promoting portion was formed in the R portion of the wound electrode body were compared with Samples 6, 8, 10 in which the short-circuit promoting portion was formed in the flat portion, it was found that an excellent temperature increase inhibiting effect was achieved when the short-circuit promoting portion was formed in the R portion.

The test examples have been described as specific examples of the present disclosure. However, those examples are for illustration only and do not limit the present disclosure. The present disclosure includes the foregoing specific examples with various modifications and changes.

What is claimed is:

1. A nonaqueous electrolyte secondary battery comprising:
an electrode body in which a plurality of electrode sheets is laminated via a separator; and
a pair of electrode terminals electrically connected to the electrode body, wherein:
each of the electrode sheets is a sheet-shaped electrode in which an electrode mixture layer is formed on a surface of a current collector foil, the each of the electrode sheets including a current collector foil exposed portion in which the current collector foil is exposed, the current collector foil exposed portion being formed in a corresponding one of side edge portions, in a width direction, of the each of the electrode sheets;
the electrode body includes
a core portion where the electrode mixture layers of the electrode sheets are laminated in a central part of the electrode body in the width direction,
terminal connecting portions to which the electrode terminals are connected, respectively, the terminal connecting portions being formed in both side edge portions of the electrode body in the width direction such that respective current collector foil exposed portions are laminated, and

TABLE 2

| | | 1 | 5 | 6 | 7 | 8 | 9 | 10 |
|---|---|---|---|---|---|---|---|---|
| Short-circuit promoting portion | Depth (vs separator thickness) | — | 30% | 30% | 30% | 30% | 30% | 30% |
| | Formation position | | Outermost periphery - R portion | Outermost periphery - flat portion | Intermediate periphery - R portion | Intermediate periphery - flat portion | Innermost periphery-R portion | Innermost periphery-flat portion |
| Charging stop timing | | No stop | After two sec | After four sec | After four sec | After four sec | After two sec | After two sec |
| Maximum temperature (° C.) | | 200° C. or more | 110° C. | 130° C. | 140° C. | 145° C. | 100° C. | 115° C. |

As illustrated in Table 2, in any of Samples 5 to 10, a sudden temperature increase to a high-temperature range was restrained. Further, as a result of comparison between Samples 5, 7, 9, the formation position of the short-circuit promoting portion in the electrode body in the thickness direction exhibited such a tendency that a temperature increase inhibiting effect becomes larger in order of the a mixture layer non-facing portion formed in at least one of boundaries of the core portion with the terminal connecting portions, the mixture layer non-facing portion being configured such that the electrode mixture layer faces the current collector foil exposed portion; and
a short-circuit promoting portion constituted by a recessed portion having a depth of 30% or more of a thickness of the separator is formed in the separator provided between the electrode sheets in the mixture layer non-facing portion.

2. The nonaqueous electrolyte secondary battery according to claim 1, wherein the short-circuit promoting portion is an elongated groove extending along a side edge of the core portion.

3. The nonaqueous electrolyte secondary battery according to claim 1, wherein:
joining portions where the terminal connecting portions are joined to the electrode terminals, respectively, are formed in respective connection parts of the terminal connecting portions with the electrode terminals; and
a total area of the short-circuit promoting portion is 25% or more of an area of a joining portion closer to the short-circuit promoting portion out of the joining portions.

4. The nonaqueous electrolyte secondary battery according to claim 1, wherein the short-circuit promoting portion is formed in the separator placed on an outermost side in a thickness direction of the electrode body.

5. The nonaqueous electrolyte secondary battery according to claim 1, wherein the short-circuit promoting portion is formed in the separator placed on an inner side in a thickness direction of the electrode body.

* * * * *